(12) United States Patent
Katahira

(10) Patent No.: US 8,610,946 B2
(45) Date of Patent: Dec. 17, 2013

(54) PRINT APPARATUS AND PRINT METHOD

(75) Inventor: Yasuhiro Katahira, Fukushima (JP)

(73) Assignee: Oki Data Corporation, Tokyo (JP)

( * ) Notice: Subject to any disclaimer, the term of this patent is extended or adjusted under 35 U.S.C. 154(b) by 722 days.

(21) Appl. No.: 12/890,807

(22) Filed: Sep. 27, 2010

(65) Prior Publication Data

US 2011/0080599 A1 Apr. 7, 2011

(30) Foreign Application Priority Data

Oct. 7, 2009 (JP) ................................ 2009-233673

(51) Int. Cl.
*G06F 15/00* (2006.01)
*G06K 15/00* (2006.01)
*H04N 1/46* (2006.01)

(52) U.S. Cl.
USPC .............. 358/1.8; 358/1.1; 358/3.1; 358/504

(58) Field of Classification Search
None
See application file for complete search history.

(56) References Cited

FOREIGN PATENT DOCUMENTS

JP 11-058841 A 3/1999

*Primary Examiner* — Thierry L Pham
(74) *Attorney, Agent, or Firm* — Panitch Schwarze Belisario & Nadel LLP

(57) ABSTRACT

Even when print data whose print density is high is printed, lowering of print efficiency according to long print operation time is restrained. In a print apparatus for printing received data received from an upper apparatus by repeatedly moving a print head, an expanding section that expands the received data into print image data; a confirming section that confirms a print density of the print image data and confirms existence/inexistence of high-density print data whose print density is higher than a predetermined value; a determining section that calculates a print operation time in the case to print by moving the print head in a forward direction and a print operation time in the case to print by moving the print head in a backward direction and determines a print direction according to these print operation time; and a print controlling section that prints in the determined direction are furnished.

16 Claims, 11 Drawing Sheets

PRINT APPARATUS AND PRINT METHOD

FIELD OF THE INVENTION

The invention relates to a print method and a print apparatus such as serial dot impact printer and the like that perform a high-density print to repeatedly move a print head.

BACKGROUND OF THE INVENTION

In a former serial dot impact printer (hereinafter: printer), if print density of print operation is high, load with respect to electric source is extremely large, and the droop of electric source voltage is easy to occur. These days in which low price of printer is advancing, it is difficult to realize to develop an electric source apparatus in which the droop of electric source voltage does not occur even though a high-density print is executed, and which does not influence the print at all even though the electric voltage droops, because cost of the electric source apparatus is raised and causes high price of printer.

According to such situation, the former printer furnishes mechanism that can detect the droop of the electric source voltage, and printer control program further detects the droop of the electric source voltage by using electric source voltage droop detecting mechanism, when the droop of the electric source voltage is detected, low speed print in which the print speed is reduced and division print in which one line is printed by moving the print head plural times through plural paths print are performed, and the load reduction to the electric source apparatus of the high-density print operation time is attempted.

Further, there is such one that prints in a low voltage in the case of the high-density print; and prints in a high voltage in the case of the low-density print (for example, referring to patent document 1).

Patent document 1; Japan patent publication of No. 11-58841 (Paragraph [0029]~Paragraph [0030], FIG. 1 and FIG. 8)

However, in the former technology stated above, when the electric source voltage droop is detected through print data whose print density is high, because low speed print and division print are executed and print time becomes long, there is a problem that print efficiency is low. Especially, even when instantaneous drop of the electric source voltage and the electric source voltage droop through print data whose print density is high in a short region that exists in a print block are detected, because the low speed print and the division print are executed, there is a problem that the print time becomes long.

For example, as shown by FIG. 16, in print block in which there are print data whose print density is high on the left side of the figure (high-density print block) and print data whose print density is low on the right side (low-density print block), in the case to print through moving the print head from the left side to the right side of the figure, the droop of the electric source voltage is started from a position shown by P1 in the figure through the print of the high-density print block. The control program of the printer, through detecting the droop of the electric source voltage, executes a low speed print control that gradually reduces print speed. The low speed print control that reduces the print speed is continued until the electric source voltage becomes low to "division print start voltage" that is shown by P2 in FIG. 16. Furthermore, when the electric source voltage droops to the division print start voltage point shown by P2 in the figure through continuing the print operation, a path division print control is started through plural paths print of over two paths from the detection point. The path division print control is continued until print of block that is being printed is completed.

Thus, when the droop of the electric source voltage is detected, because the low speed print and the division print are executed and the print time becomes long, the print efficiency becomes low.

SUMMARY OF THE INVENTION

It is, therefore, an object of the invention to provide a print apparatus and a print method that can solve the above problem. That is, even when print data whose print density is high is printed, lowering of print efficiency according to long print operation time is restrained.

A first aspect of the invention is to provide a print apparatus that is used for printing received data received from an upper apparatus by repeatedly moving a print head, comprising: an expanding section that expands the received data into print image data; a confirming section that confirms a print density of the print image data expanded by the expanding section, and confirms existence/inexistence of high-density print data whose print density is higher than a predetermined value; a determining section that, when the confirming section confirms the existence of the high-density print data, calculates a print operation time in the case to print by moving the print head in a forward direction, calculates a print operation time in the case to print by moving the print head in a backward direction, and determines a print direction according to these print operation time; and a print controlling section that prints in the direction determined by the determining section.

A second aspect of the invention is to provide a print method that is used for printing received data received from an upper apparatus by repeatedly moving a print head, comprising: a step that expands the received data into print image data; a step that confirms a print density of the expanded print image data, and confirms existence/inexistence of high-density print data whose print density is higher than a predetermined value; a step that, when the existence of the high-density print data is confirmed, calculates a print operation time in the case to print by moving the print head in a forward direction, calculates a print operation time in the case to print by moving the print head in a backward direction, and determines a print direction according to these print operation time; and a step that prints in the determined direction.

THE EFFECT OF THE PRESENT INVENTION

According to the present invention, even when print data whose print density is high is printed, an effect is obtained that lowering of print efficiency according to long print operation time is restrained.

The above and other objects and features of the present invention will become apparent from the following detailed description and the appended claims with reference to the accompanying drawings.

DETAILED DESCRIPTION OF THE PREFERRED EMBODIMENTS

Embodiments of the invention will be described in detail hereinbelow with reference to the drawings.

Embodiment 1

Figure 2:
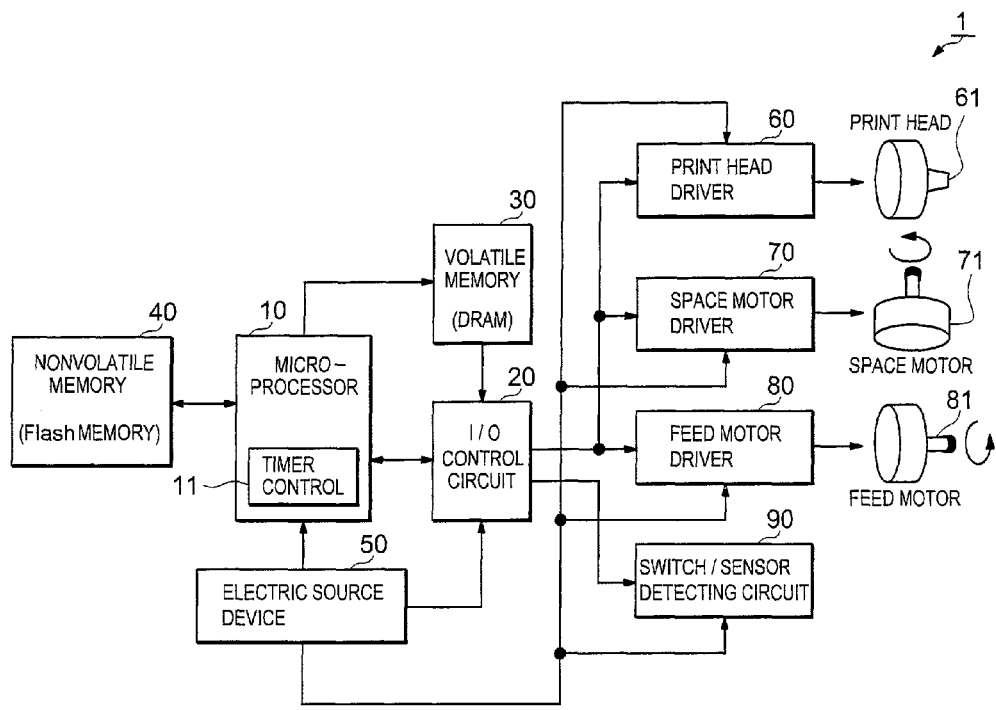
FIG. 2 is a block diagram showing a structure of a printer in embodiment 1.

FIG. 2 is a block diagram showing a structure of a printer in embodiment 1.

In FIG. 2, a printer 1 as a print apparatus is a serial dot impact printer that prints received data that is received from an upper apparatus through repeatedly moving a print head, and comprises a microprocessor 10, an I/O control circuit 20, a volatile memory 30, a nonvolatile memory 40, an electric source device 50, a print head driver 60, a print head 61, a space motor driver 70, a space motor 71, a feed motor driver 80, a feed motor 81 and a switch/sensor detecting circuit 90.

The microprocessor 10 as a controlling section is a processor such as a center process calculation apparatus that analyzes an order of a printer control program stored in the nonvolatile memory 40 such as Flash memory and the like and executes the order. A timer control 11 is furnished in the microprocessor 10, and is a timekeeping means for monitoring a detection of switch pressing condition and an electric source voltage droop condition in every constant time.

The I/O (Input/Output) control circuit 20 is a circuit that controls data access control with respect to the volatile memory 30 such as DRAM (Dynamic Random Access Memory) and the like and print operation. In the I/O control circuit 20, the print head driver 60 that drives a head driver for projecting dot pins of the print head 61 according to bitmap expanded data stored in the volatile memory 30, the space motor driver 70 that drives the space motor 71 for moving the print head 61, the feed motor driver 80 that drives the space motor 71 for executing conveyance of paper, and the switch/sensor detecting circuit 90 that detects condition of switch pressed by user using the printer 1, paper sensor and the like that, are connected.

The volatile memory 30 is a memory that stores information so that printer control program stored in the nonvolatile memory 40 realizes print operation, and is connected with the microprocessor 10 and the I/O control circuit 20.

The nonvolatile memory 40, in which program that controls the whole printer 1 and various parameters (threshold) are stored, is connected to the microprocessor 10.

The electric source device 50 is a unit supplying electric source in order to drive the printer 1, is connected to all the shown devices, supplies electric source to respective devices.

The print head driver 60 is a driver in order to print by driving the print head 61, and is connected with the I/O control circuit 20 and the print head 61.

The space motor driver 70 is a driver that drives the space motor 71 for moving a space carriage that furnishes the print head 61 in a direction perpendicular to a conveyance direction of paper, and is connected with the I/O control circuit 20 and the space motor 71.

The feed motor driver 80 is a driver that drives the feed motor 81 for conveying paper, and is connected with the I/O control circuit 20 and the feed motor 81.

The switch/sensor detecting circuit 90 is a circuit that performs a detection of pressed condition of switch furnished in the printer apparatus and a judgment of existence/inexistence of paper through using paper sensor.

Figure 1:
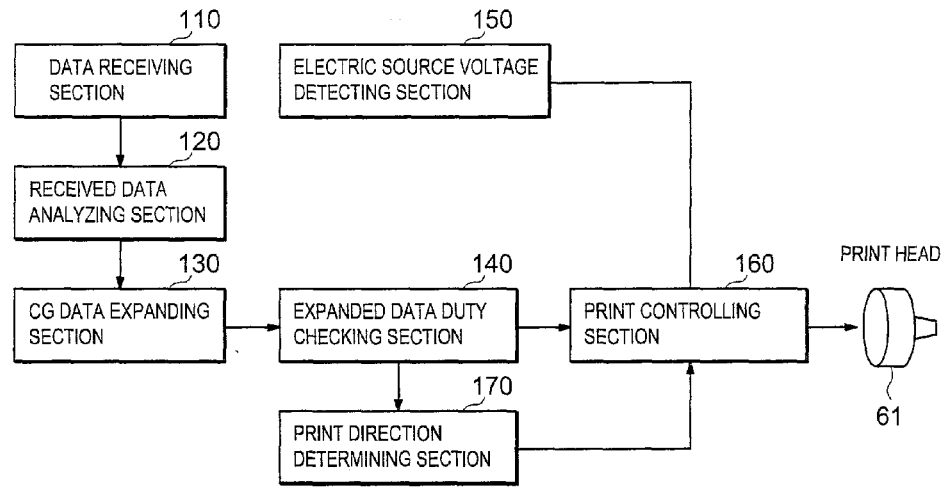
FIG. 1 is a block diagram showing a structure of print control of a printer in embodiment 1.

FIG. 1 is a block diagram showing a structure of print control of a printer in embodiment 1.

A data receiving section 110 receives data that is sent from an upper apparatus (not shown) (personal computer and business use terminal), and stores the received data in a receiving buffer (not shown) furnished in the volatile memory 30 that is explained by FIG. 2.

A received data analyzing section 120 takes out the received data stored in the receiving buffer (not shown) by the data receiving section 110 stated above, and executes an analysis of the data. Through the analysis of data, print data and print control command are continuously processed as one line part of data (the one line part of data is served as "print block").

A CG data expanding section 130 makes bitmap expansion of image data, that is data to be printed, through character data (for example, "A~Z" of the alphabet and the like) and command in a form in which the print head can impact, and stores them in the data expanding buffer (not shown) furnished in the volatile memory 30 shown by FIG. 2, similarly to the data sent as impact data (print image data) from the upper apparatus. Thus, the CG data expanding section 130 has a function as an expanding section that expands the received data into print image data.

An expanded data duty checking section 140 performs a process that measures density of impact data bitmap expanded in the CG data expanding section 130. In the present process, measurement of print density of impact data to be printed (measurement of density of part in which there are many dot impact numbers of the print head and whose print density is high, location in the impact data, and length of the high print density part) is executed, and location and length of high-density print data block (hereinafter: high-density print block) and low-density print data block (hereinafter: low-density print block) in the impact data are calculated. Thus, the expanded data duty checking section 140 confirms print density of the expanded print image data, and has a function as a confirming section that confirms existence/inexistence of high-density print data whose print density is higher than a predetermined value.

A print direction determining section 170 performs a process that determines a print direction (print start position) to move the print head in order to print the print block to be printed from now on in a shortest time according to the position and the length of the high-density print block whose print density is high, that are calculated in the expanded data duty checking section 140. Thus, the print direction determining section 170, when the existence of the high-density print data is confirmed, calculates a print operation time in the case to print through moving the print head in a forward direction and a print time in the case to print through moving the print head in a backward direction, and functions as a determining section to determine a print direction corresponding to these print operation times. Moreover, measurement method of printing density and print method are stated later.

An electric source voltage detecting section 150 performs a control that measures electric source voltage supplying to the printer 1, measures electric source voltage level in every constant time by using the timer control 11 in the microprocessor 10 shown by FIG. 2, and feed backs into a print controlling section 160.

The print controlling section 160 performs a control that prints the impact data generated in the CG data expanding section 130 onto paper through moving the print head 61 according to the print direction determined in the print direction determining section 170. Further, the print controlling section 160 performs low speed print and division print in the case that electric source voltage measured in the electric source voltage detecting section 150 droops compared with the fixed value that is previously stored in the nonvolatile memory 40 shown by FIG. 2.

The printer 1 that is comprised like this, before a print control is executed according to the low speed print and the division print that are caused by the droop of the electric source voltage according to print operation, grasps high/low and the range of the print density of the impact data to be printed, and performs the print operation by determining the print direction in order to print in the shortest time.

Figure 3:
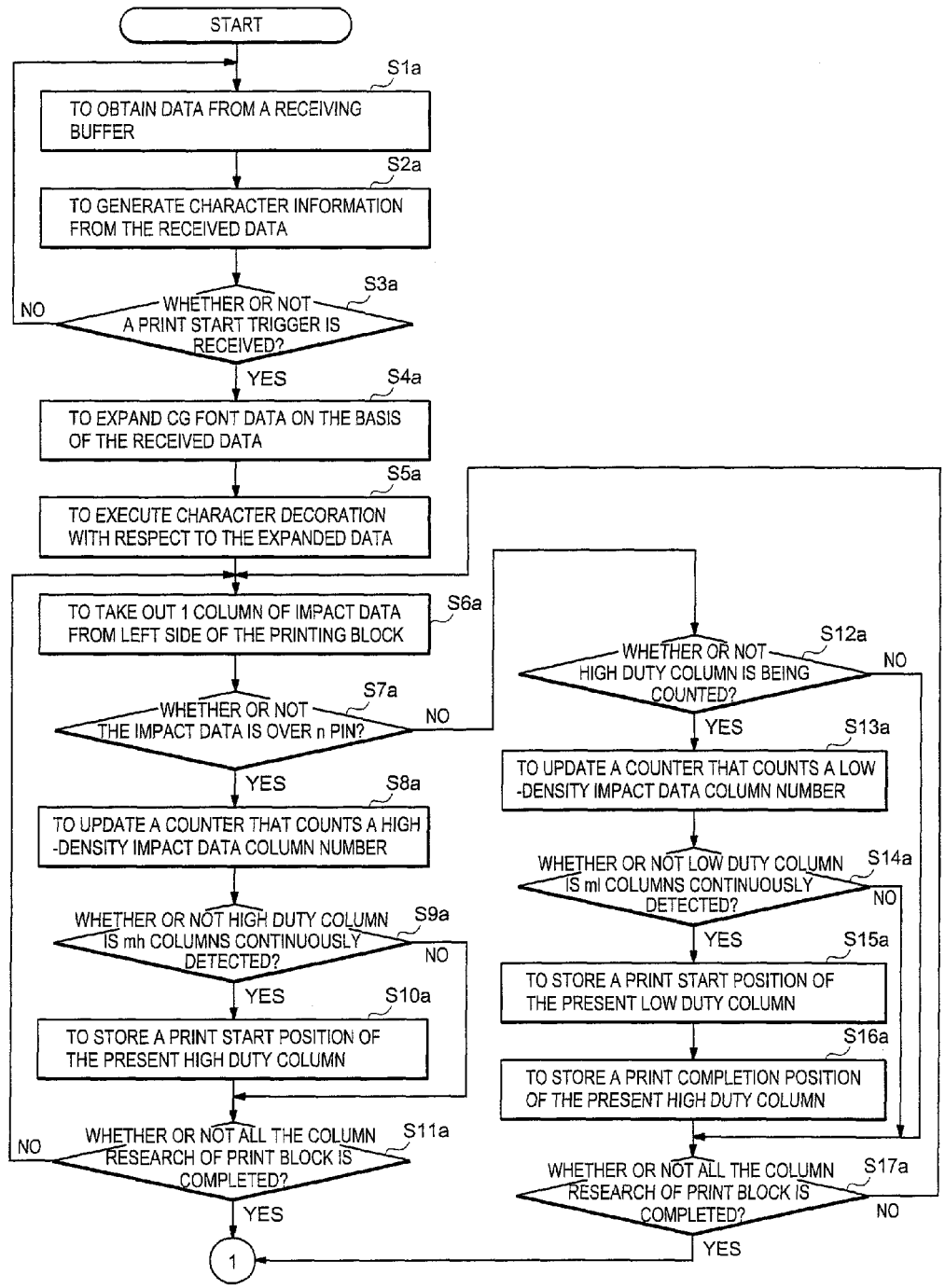
FIG. 3 is a first flow chart for explaining print process in embodiment 1.
Figure 4:
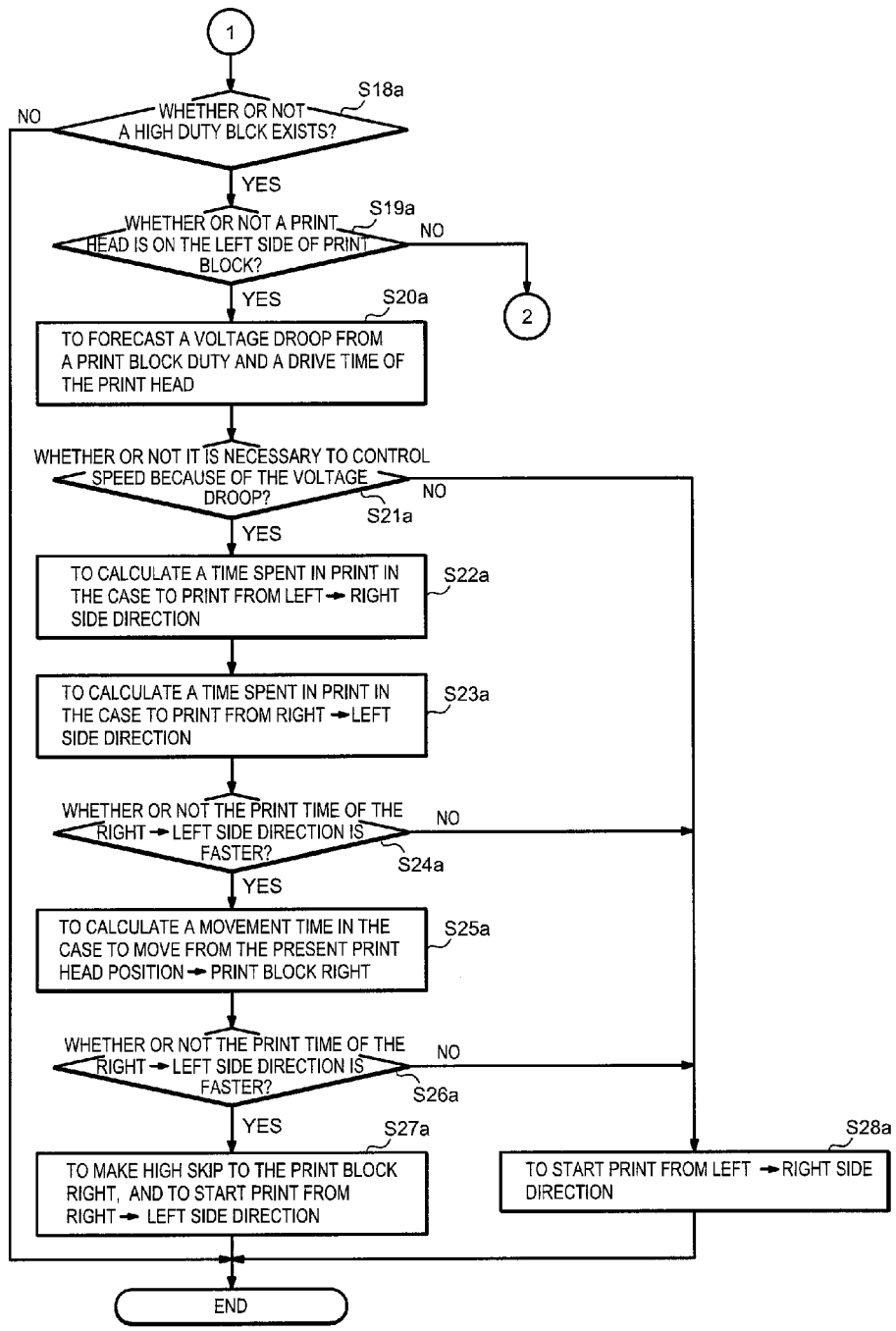
FIG. 4 is a second flow chart for explaining print process in embodiment 1.
Figure 5:
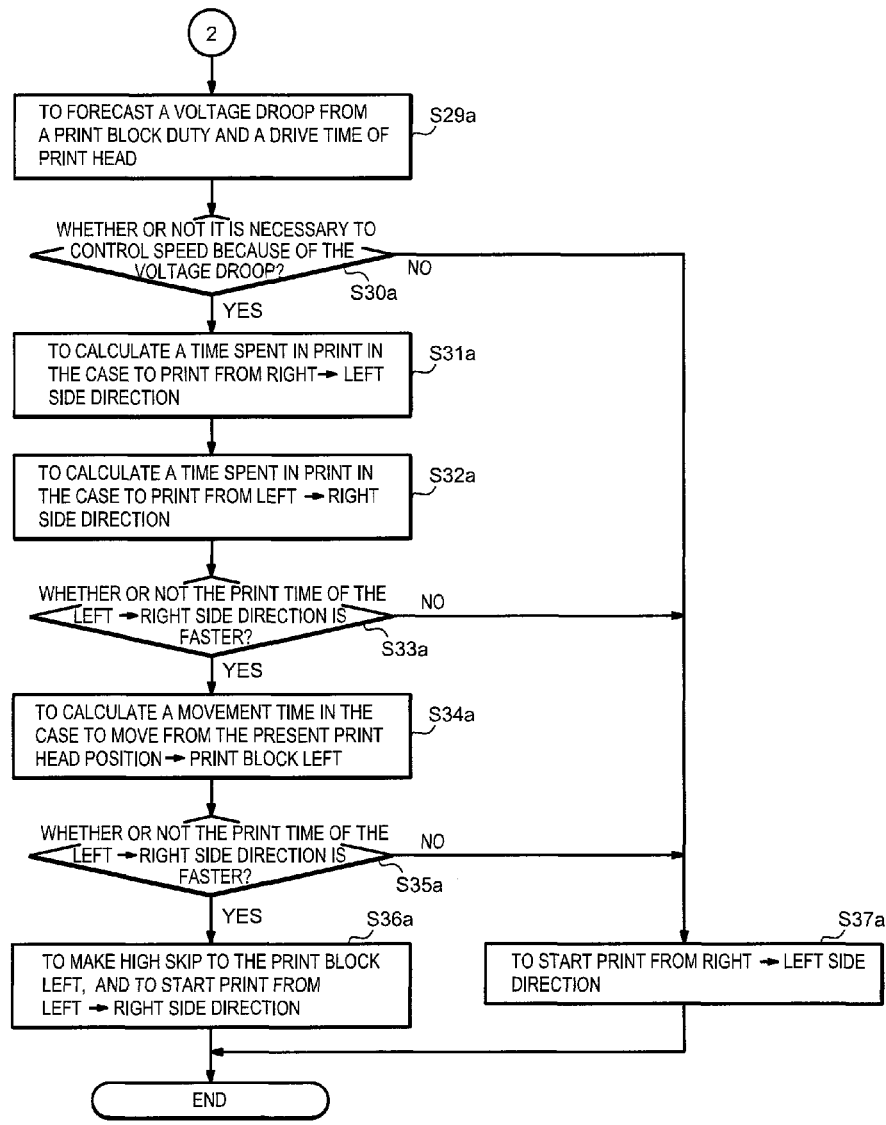
FIG. 5 is a third flow chart for explaining print process in embodiment 1.

It is to explain a function of the structure stated above by referring to FIG. 1 and by following steps shown by S in the diagram of flow chart for explaining print process in embodiment 1 of FIG. 3, FIG. 4 and FIG. 5.

S1a: Through regarding that the data receiving section 110 of the printer 1 has already received data sent by the upper apparatus, the received data analyzing section 120 takes out the received data per a byte from the receiving buffer (not shown) in the volatile memory.

S2a: The received data analyzing section 120 analyzes the taken out data, and judges whether it is data to be printed or function command that controls the printer. If it is function command, control command for attribute of printer and character ornament are executed; and if it is data to be printed, character information which is mainly composed of character ornament information for printing, font data information and the like are generated.

S3a: The received data analyzing section 120 performs a check of whether or not a control demand command and a light margin over condition that become a trigger of one line print start of line feed command, page feed execution command and the like occur. If the print start trigger is not received, the process is shifted to S1a and receiving and analysis of data are continuously executed; and if the print start trigger is received, the process is shifted to S4a.

S4a: The CG data expanding section 130, in order to print onto paper by using the print head 61, executes a process that expands character information generated by the received data analyzing section 120 into bitmap data by using CG font data.

S5a: The CG data expanding section 130 executes a modification process of character ornament with respect to the expanded bitmap data, and generates impact data. Here, the character ornament means twice enlargement in width, twice enlargement in length, or italic, emphasis, and the like.

S6a; After the bitmap expansion and the character ornament of all the printed data block are completed, the expanded data duty checking section 140 takes out the impact data that is generated by the CG data expanding section 130 per a column, and executes a density check of the print block. Here, one column is one row of a direction perpendicular to a direction in which the print head 61 moves, that is, one row corresponding to a row of dot pins in the print head 61.

S7a: The expanded data duty checking section 140 checks the impact data per a column in order to execute the check of the print density. The check method is to judge whether or not impact data with over n pins exists in the expanded one column data. When it is impact data with over n pins, the process is shifted to S8a; when it is impact data with under n pins, the process is shifted to S12a.

The "n pins" that is a judgment parameter (first threshold) is a number that changes according to the efficiencies of the printer 1 and the electric source apparatus. In the present embodiment, when impact data with over 7 pins per a column exists in the case of the printer using print head with 9 pins, or when impact data with over 8 pins per a column exists in the case of the printer using print head with 24 pins, it is served as high-density print column data.

S8a: The expanded data duty checking section 140, when impact pin number per a column is over n pins (over 7 pins in the printer using print head with 9 pins, over 18 pins in the printer using print head with 24 pins), counts a high-density print column number.

S9a: The expanded data duty checking section 140 judges whether or not high-density print (High Duty) column data in which there are many impact dot number continues over mh columns, if it is judged that it continues, the process is shifted to S10a; and if it is judged that it does not continue, the process is shifted to S11a.

S10a: The expanded data duty checking section 140 that judges that the high-density print (High Duty) column data continues over mh columns stores a position from the top of the impact data of the column (column number from the top of the impact data) that is detected firstly in the continuous high-density print column data into a volatile memory as a high-density print column start position.

It is fully considered that a plurality of the high-density print column start positions exist in the print block, and the plurality of positions can be stored. Further, "mh columns" that is a judgment parameter (second threshold) changes according to the efficiencies of the printer 1 and the electric source apparatus. In the present embodiment, "mh columns" is served as 5 columns, and when the high-density print column is continuously detected over 5 columns, it is judged that it is a high-density print block.

S11a: The expanded data duty checking section 140 performs a judgment of whether or not a print density check of all the expanded columns of the print block is completed. If the print density check about all the columns is not completed, the process is returned to S6a and the density check per a column is continued; and if it is completed, the process is shifted to S18a.

S12a: On the other condition, in S7a, when it is judged that it is impact data with under n pins, that is, when under n pins of impact dot number is detected in the duty check per a column, the expanded data duty checking section 140 judges whether or not the continuous high-density print (High Duty) column data is being counted. After it is judged that it is being counted, in order to shift the process to a check process that serves a completion check of the high-density print block as main, the process is shifted to S13a; and if it is judged that is it not being counted, the process is shifted to S6a.

S13a: The expanded data duty checking section 140 executes an update of counter that counts a low-density impact data column number.

S14a: The expanded data duty checking section 140 judges whether or not low-density print (Low Duty) column data in which there is few impact dot number continues over ml columns in order to judge the completion of the high-density print block, if it is judged that it continues, the process is shifted to S15a; and if it is judged that it does not continue, the process is shifted to S17a.

Here, "ml columns" that is a judgment parameter (third threshold) changes according to the efficiencies of the printer 1 and the electric source apparatus. In the present embodiment, "ml columns" is served as 10 columns, and when the low-density print column is continuously detected over 10 columns, it is judged that it is a low-density print block.

S15a: The expanded data duty checking section 140 that judges that the low-density print (Low Duty) column data continues over ml columns stores a position from the top of the impact data of the column (column number from the top of the impact data) that is detected firstly in the continuous low-density print column data into a volatile memory as a low-density print column start position. It is fully considered that a plurality of the low-density print column start positions exist in the print block, and the plurality of positions can be stored.

S16a: The expanded data duty checking section 140, through detecting the low-density print block, stores the position from the top of the impact data of the column (column number from the top of the impact data) that is detected firstly in the continuous low-density print column data into a volatile memory as a high-density print column completion position.

S17a: The expanded data duty checking section 140 performs a judgment of whether or not print density check of all the expanded columns of the print block is completed. If the print density check about all the columns is not completed, the process is returned to S6a and the density check per a column is continued; and if it is completed, the process is shifted to S18a.

Next, it is to explain about a control that determines a print direction from print density information in print block.

S18a: Firstly, the print direction determining section 170 performs a check of whether or not high-density print block exists in the print block, that is, whether or not the high-density print column start position exists. When the high-density print block does not exist in the print block, the present judgment process is completed, and print is started according to a former shortest distance print. On the other hand, when the high-density print block exists in the print block, the process is shifted to S19a.

S19a: The print direction determining section 170 judges a position of the print head, when the print head is located on the left side in FIG. 6, it shifts the process to S20a; on the other hand, when the print head is located on the right side in FIG. 6, it shifts the process to S29a.

Figure 9:
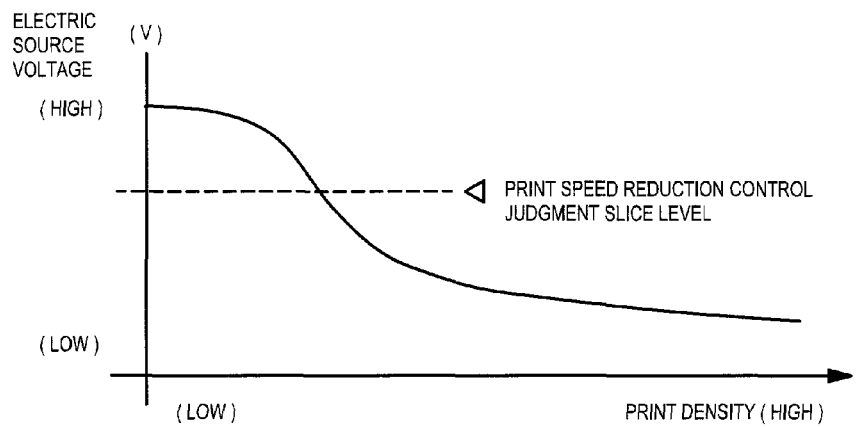
FIG. 9 is a graph showing a relation between print density and electric source voltage droop in embodiment 1.

S20a: On the basis of the high-density print column number and the impact dot number that are counted in S8a, the print direction determining section 170 forecasts the electric source voltage droop according to the print. The forecast of the electric source voltage droop is to be performed on the basis of the relation between print density (print block duty) and the electric source voltage droop according to the drive time of the print head, for example, the forecast is performed by using a graph that shows a relation between the print density and the electric source voltage droop in embodiment 1 of FIG. 9. The electric source voltage is rapidly drooped if the column in which there is many impact dot number continues.

S21a: The print direction determining section 170 performs a judgment of need/needless of control of print speed caused by that voltage droop level exceeds a predetermined value according to the high-density print in the print block. Even though the high-density print is executed, when it is possible to print without large lowering of the electric source voltage, the process is shifted to S28a, and the print is performed through moving the print head from the left to the right direction. On the other hand, if the reduction control of print speed according to the electric source voltage droop is necessary, the process is shifted to S22a, a print speed suitable for the forecasted electric source voltage is calculated, and it is served as a print speed for high-density print block.

S22a: The print direction determining section 170 calculates a print time in the case to print through moving the print head from the left to the right direction (forward direction).

Figure 6:
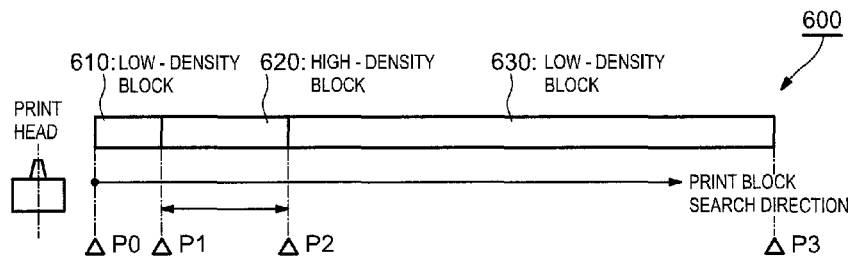
FIG. 6 is an explanation diagram of print operation in embodiment 1.
Figure 7:
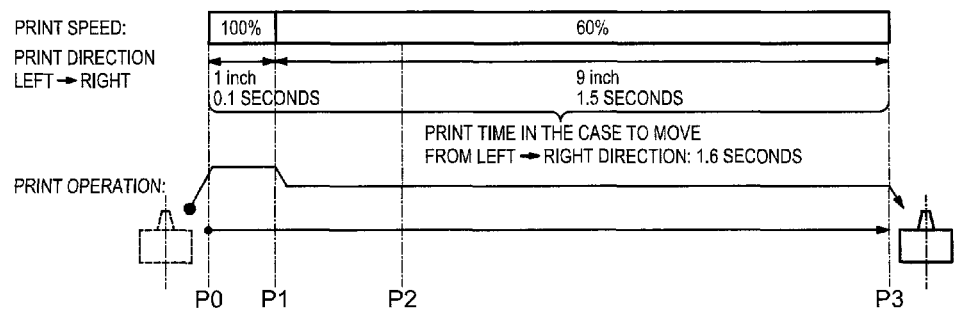
FIG. 7 is an explanation diagram of print time calculation method in embodiment 1.

Here, it is to explain a calculation of the print time in the present embodiment by using an explanation diagram of print operation in embodiment 1 of FIG. 6 and an explanation diagram of print time calculation method in embodiment 1 of FIG. 7. Moreover, the control explained from now on is to explain by serving the print speed as 10 IPS (Inch Per Second), by serving the print block length as 10 inches, and by supposing the print speed of the high-density print block as 60% of usual print speed.

With respect to FIG. 6 and FIG. 7, after a print block 600 is searched from the left end P0 to the right end P3 of the print block 600 in diagram, a low-density print block 610 whose block length is 1 inch exists. Because the low-density print block 610 is a block to perform a low-density print and the print speed control according to the droop of the electric source voltage can be judged unnecessary, it takes 0.1 seconds to print 1 inch of the low-density print block 610.

Next, because a high-density print block 620 is 2 inches length and the print speed, which becomes 60% because of a high-density print, is reduced to 6 IPS, it takes 0.333 seconds to print 2 inches of the high-density print block 620. Though 7 inches of a low-density print block 630 exists on the right side of the high-density print block 620, because the print speed that has been reduced according to the print of the high-density print block 620 is not raised so as to secure print quality even though the drooped electric source voltage is restored, the print speed of the 7 inches of the low-density print block 630 becomes 60% (6 IPS) of 10 IPS, and the print time becomes 1.167 seconds. From the above calculation result, the print time spent in one line print becomes 1.6 seconds (0.1 seconds+0.333 seconds+1.167 seconds).

S23a: Next, a print time is calculated in the case to print by moving the print head from the right to the left direction (backward direction) after high skip moving the print head from the position of the left side to the position of the right side in the diagram. The object of the present process is to measure a print time in the case to print the print block shown in the diagram from the right to the left direction. Here, it is to explain by using the explanation diagram of the print operation in embodiment 1 of FIG. 6 and an explanation diagram of the print time calculation method in embodiment 1 of FIG. 8.

Figure 8:
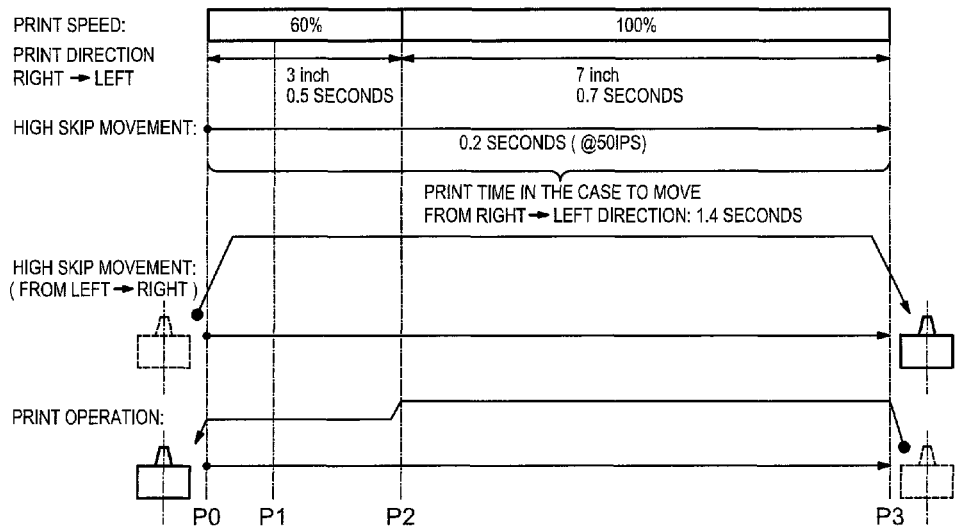
FIG. 8 is an explanation diagram of print time calculation method in embodiment 1.

With respect to FIG. 6 and FIG. 8, after the print block 600 is searched from the right end P3 to the left end P0 of the print block 600 in diagram, because the low-density print block 630 whose block length is 7 inches exists, it takes 0.7 seconds to print. Then, because the high-density print block 620 whose width is 2 inches exists, the print speed becomes 6 IPS according to the electric source voltage droop, and after the electric source voltage is drooped, because the print speed is not raised according to voltage raising, it takes 0.5 seconds to print the remaining 3 inches of the print block (the high-density print block 620 and the low-density print block 610). Therefore, the print time in the case to execute print operation by moving the print head from the right to the left direction becomes 0.7 seconds for the low-density print+0.5 seconds for the high-density print, and becomes 1.2 seconds in total.

From the above calculation result, it is understood that the time spent to print by moving the print head from the right to the left direction is about 0.4 seconds faster than the time spent to print by moving the print head from the left to the right direction.

S24a: The print direction determining section 170 compares print times that are calculated in S22a and S23a, and grasps a print direction whose print time is shorter. When it is judged that the print time from the right to the left direction is shorter, the process is shifted to S25a, and a high skip movement time for moving the print head from the left to the right is calculated. When it is judged that the print time from the left to the right direction is shorter, the process is shifted to S28a, and the print is started.

S25a: Next, the print direction determining section 170 calculates a print time in the case to print by moving the print head from the right to the left direction after high skip moving the print head from the present left position to the right position. Firstly, a movement time is measured in the time to move the print head located on the left side of the print block to the right side of the print block. The movement to the right side of the print block is served as a high skip movement whose movement speed is 50 IPS. Accordingly, the movement time of the high skip becomes 0.2 seconds.

S26a: The print direction determining section 170 calculates a total time of the print operation by adding the print time calculated in S23a and the high skip movement time calculated in S25a. In the present embodiment, because the time spent in the print is 1.2 seconds and the movement time in high skip is 0.2 seconds, the total time of the print operation becomes 1.4 seconds. As a result, the print direction determining section 170 judges that the print operation time to print by moving the print head from the right to the left direction is the shortest, and shifts the process to S27a. On the other hand, when it is judged that the print operation time to print by moving the print head from the left to the right direction is the shortest, the process is shifted to S28a.

S27a: The print controlling section 160 makes the print head high skip move to the right side, performs a print by moving the moved print head from the right to the left direction, and completes the process.

S28a: The print controlling section 160 performs the print by moving the print head from the left to the right direction, and completes the process.

S29a: In the case that the print head is located on the right side in S19a, similarly, on the basis of the high-density print column number that is counted in S8a, the print direction determining section 170 forecasts the electric source voltage droop according to the print. The forecast of the electric source voltage droop is performed on the basis of the relation between print density (print block duty) and the electric source voltage droop according to the drive time of the print head, for example, the forecast is performed by using a graph that shows a relation between the print density and the electric source voltage droop in embodiment 1 of FIG. 9. The electric source voltage is rapidly drooped if the column in which there is many impact dot number continues.

S30a: The print direction determining section 170 performs a judgment of need/needless of control of the print speed on the basis of the voltage droop level according to the high-density print in the print block. Even though the high-density print is executed, when it is possible to print without large lowering of the electric source voltage, the process is shifted to S37a, and the print is performed through moving the print head from the left to the right direction. On the other hand, if the reduction control of the print speed according to the electric source voltage droop is necessary, the process is shifted to S31a, a print speed suitable for the forecasted electric source voltage is calculated, and it is served as a print speed for high-density print block.

S31a: The print direction determining section 170 calculates a print time in the case to print through moving the print head from the right to the left direction (forward direction).

Here, it is to explain a calculation of the print time in the present embodiment by using the explanation diagram of the print operation in embodiment 1 of FIG. 6. Moreover, it is to explain by serving the print speed as 10 IPS (Inch Per Second), by serving the print block length as 10 inches, and by supposing the print speed of the high-density print block as 60% of the usual print speed.

With respect to FIG. 6, after the print block is searched from the left side of the print block in diagram, a low-density block whose block length is 7 inches exists. Because this block is a low-density print block and the print speed control according to the droop of the electric source voltage can be judged unnecessary, it takes 0.7 seconds to print 7 inches of the low-density print block. Next, because a high-density print block is 2 inches length and the print speed, which becomes 60% because of a high-density print, is reduced to 6 IPS, it takes 0.333 seconds to print 2 inches of the high-density print block. Though 1 inch of a low-density print block exists on the left side of the high-density print block, because the print speed that has been reduced according to the print of the high-density print block is not raised so as to secure print quality even though the drooped electric source voltage is restored, the print speed of the 1 inch of the low-density print block becomes 60% (6 IPS) of 10 IPS, and the print time becomes 0.167 seconds. From the above calculation result, the print time spent in one line print becomes 1.2 seconds (0.7 seconds+0.333 seconds+0.167 seconds).

S32a: Next, a print time is calculated in the case to print by moving the print head from the left to the right direction (backward direction) after high skip moving the print head from the position of the right side to the position of the left side in the diagram. The object of the present process is to measure a print time in the case to print the print block shown in the diagram from the left to the right direction. Here, it is to explain by using the explanation diagram of the print operation in embodiment 1 of FIG. 6.

With respect to FIG. 6, after the print block is searched from the left side of the print block in the diagram, because the low-density print block whose block length is 1 inch exists, it takes 0.1 second to print. Then, because the high-density print block whose width is 2 inches exists, the print speed becomes 6 IPS according to the electric source voltage droop, and after the electric source voltage is drooped, because the print speed is not raised according to voltage raising, it takes 1.5 seconds to print the remaining 9 inches of the print block. Therefore, the print time in the case to execute print operation by moving the print head from the left to the right direction becomes 0.1 seconds for the low-density print+1.5 seconds for the high-density print, and becomes 1.6 seconds in total.

From the above calculation result, it is understood that the time spent to print by moving the print head from the right to the left direction is about 0.4 seconds faster than the time spent to print by moving the print head from the left to the right direction.

S33a: The print direction determining section 170 compares print times that are calculated in S31a and S32a, and grasps a print direction whose print time is shorter. When it is judged that the print time from the left to the right direction is shorter, the process is shifted to S34a, and high skip movement time for moving the print head from the right to the left is calculated. When it is judged that the print time from the right to the left direction is shorter, the process is shifted to S37a, and the print is started.

S34a: Next, the print direction determining section 170 calculates a print time in the case to print by moving the print head from the left to the right direction after high skip moving the print head from the present right position to the left position. Firstly, a movement time is measured in the time to move the print head located on the right side of the print block to the left side of the print block. The movement to the left side of the print block is served as a high skip movement whose movement speed is 50 IPS. Accordingly, the movement time of the high skip becomes 0.2 seconds.

S35a: The print direction determining section 170 calculates a total time of the print operation by adding the print time calculated in S32a and the high skip movement time calculated in S25a. When the print direction determining section judges that the print operation time to print by moving the print head from the left to the right direction is the shortest, and shifts the process to S36a. On the other hand, when it is judged that the print operation time to print by moving the print head from the right to the left direction is the shortest, the process is shifted to S37a.

S36a: The print controlling section 160 makes the print head high skip move to the left side, performs a print by moving the moved print head from the left to the right direction, and completes the process.

S37a: The print controlling section 160 performs the print by moving the print head from the right to the left direction, and completes the process.

As explained above, in embodiment 1, before the print control is executed according to the low speed print and the division print that are caused by the droop of the electric source voltage according to print operation, by grasping high/low and the range of the print density of the impact data to be printed, by determining the print direction in order to print in the shortest time and by performing the print operation, such effect is obtained that it is possible to improve print efficiency.

Further, by determining the print direction according to a print time in which not only the print operation time but also the time to move the print head is added, such effect is obtained that it is possible to improve print efficiency of great precision.

Embodiment 2

In embodiment 1, though it has been to explain about a method to print a high-density print block in print operation through moving the print head once, when the print density in the horizontal direction is high and there is extremely many impact dot number, because the droop of the electric source voltage is extremely large, there is a case that the print is necessary that reduces impact number per one path according to the division print that prints one line by moving the print head for a plurality of times (path).

In embodiment 2, it is to explain a shortest print control in the case that the division print is necessary.

Figure 10:
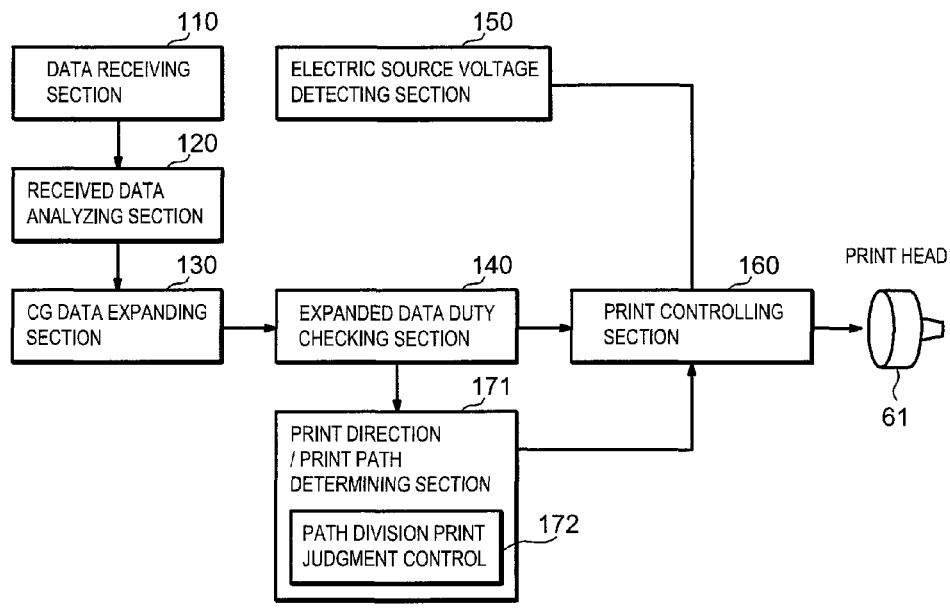
FIG. 10 is a block diagram showing a structure of print control of a printer in embodiment 2.

FIG. 10 is a block diagram showing a structure of print control of a print in embodiment 2. Moreover, with respect to the same parts as the embodiment 1 stated above, the explanations are omitted by assigning the same mark.

With respect to FIG. 10, a print direction/print path determining section 171, according to the position and the length of the high-density print block whose print density is high, that are calculated in the expanded data duty checking section 140, performs a process that determines a print direction (print start position) to move the print head in order to print the print block to be printed from now on in a shortest time, and the process that determines a need/needless of the path division print that reduces the droop of the electric source voltage.

A path division print judgment control 172, when there are extremely high print density (print DPI) and many impact dot number of the high-density print block in the horizontal direction, and when it is difficult to print in one path because the droop of the electric source voltage becomes extremely large, decreases impact dot number per one path through executing print operation in a plurality of paths, and judges whether or not the path division print is necessary that reduces the droop of the electric source voltage.

To be concrete, the path division print judgment control 172 judges that the division print is necessary, when the impact dot number corresponding to the print density (print DPI) of the high-density print block in the horizontal direction (moving direction of the print head) exceeds the threshold that is previously stored in the nonvolatile memory.

Figure 11:
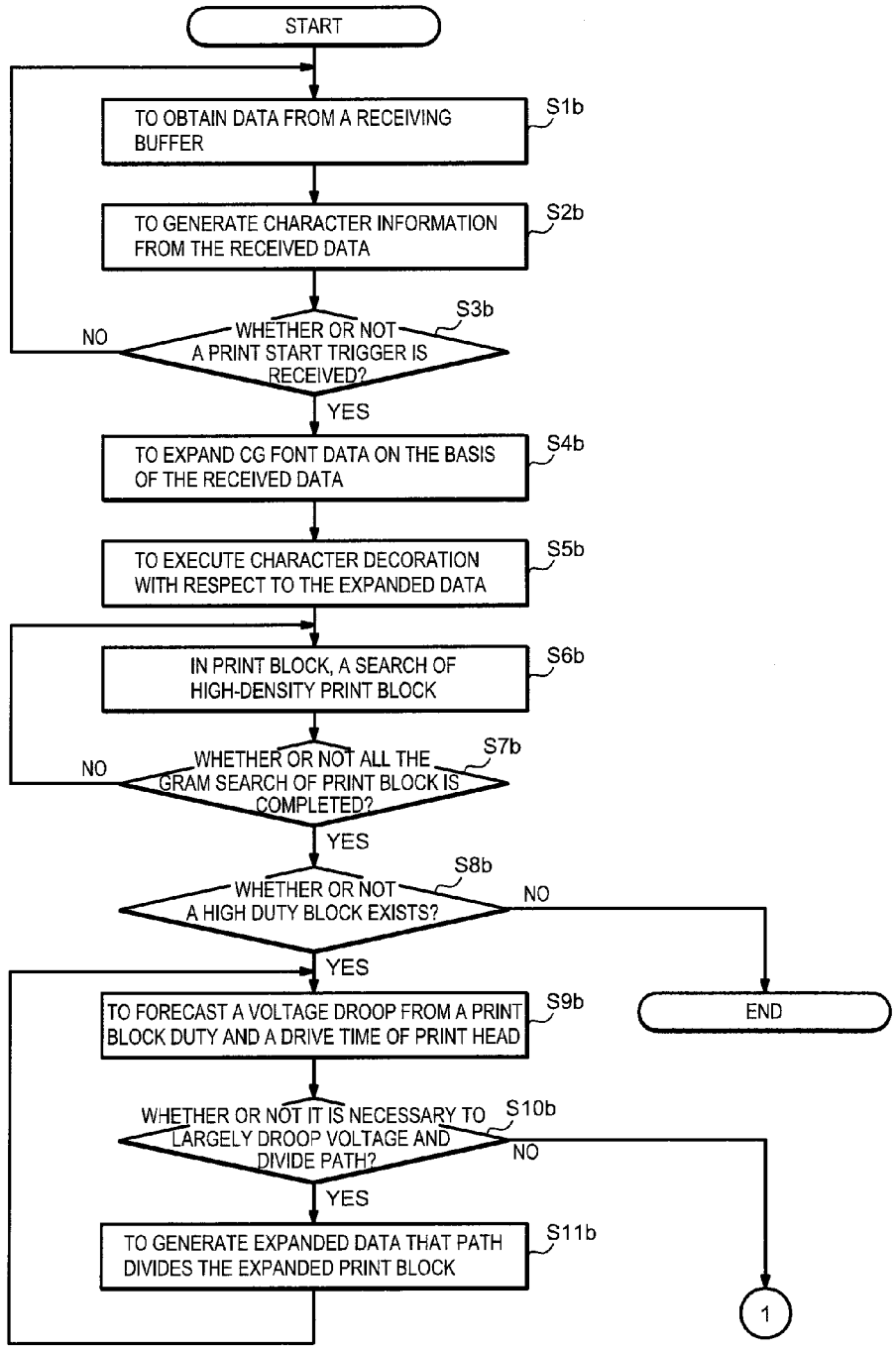
FIG. 11 is a first flow chart for explaining print process in embodiment 2.
Figure 12:
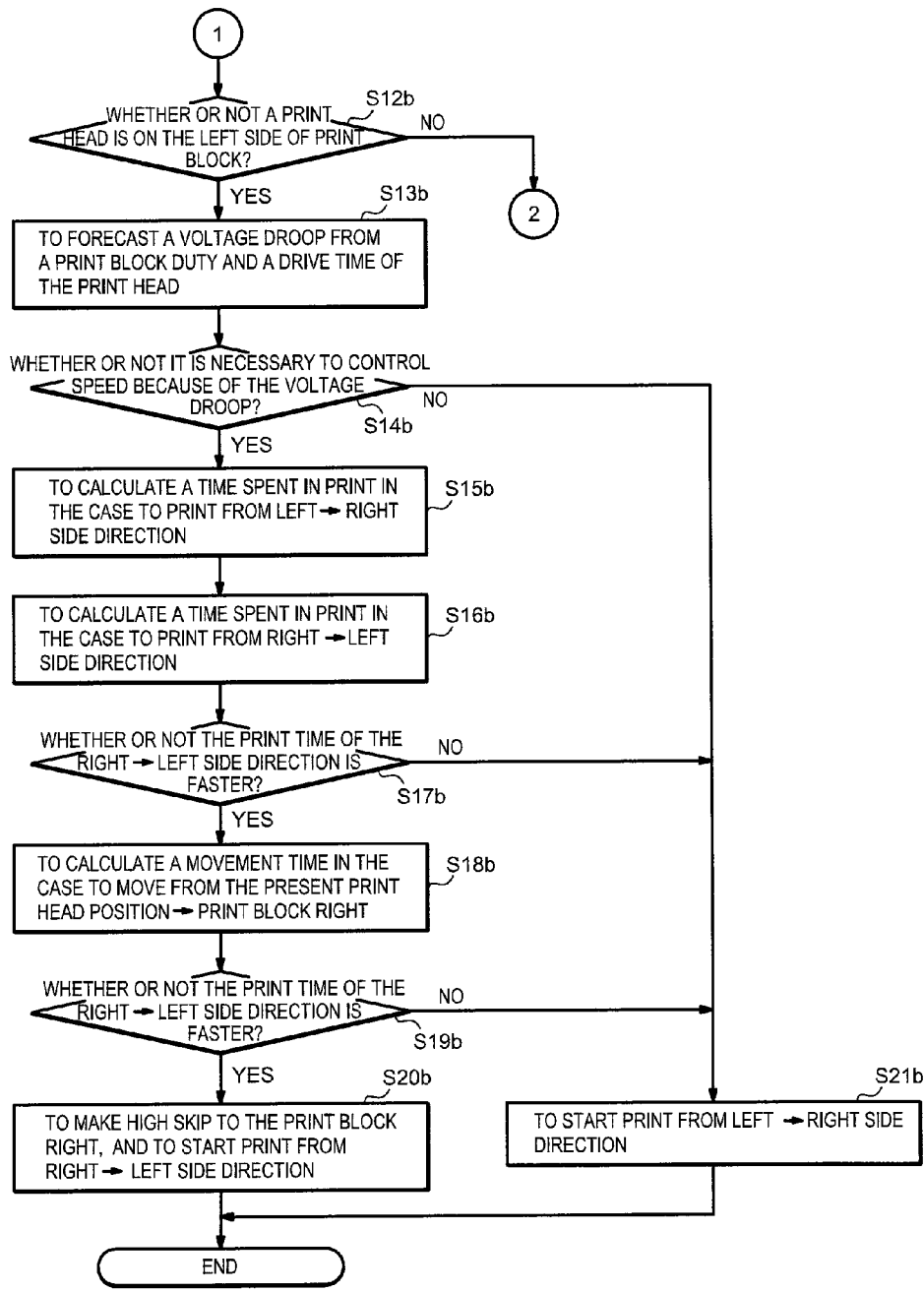
FIG. 12 is a second flow chart for explaining print process in embodiment 2.
Figure 13:
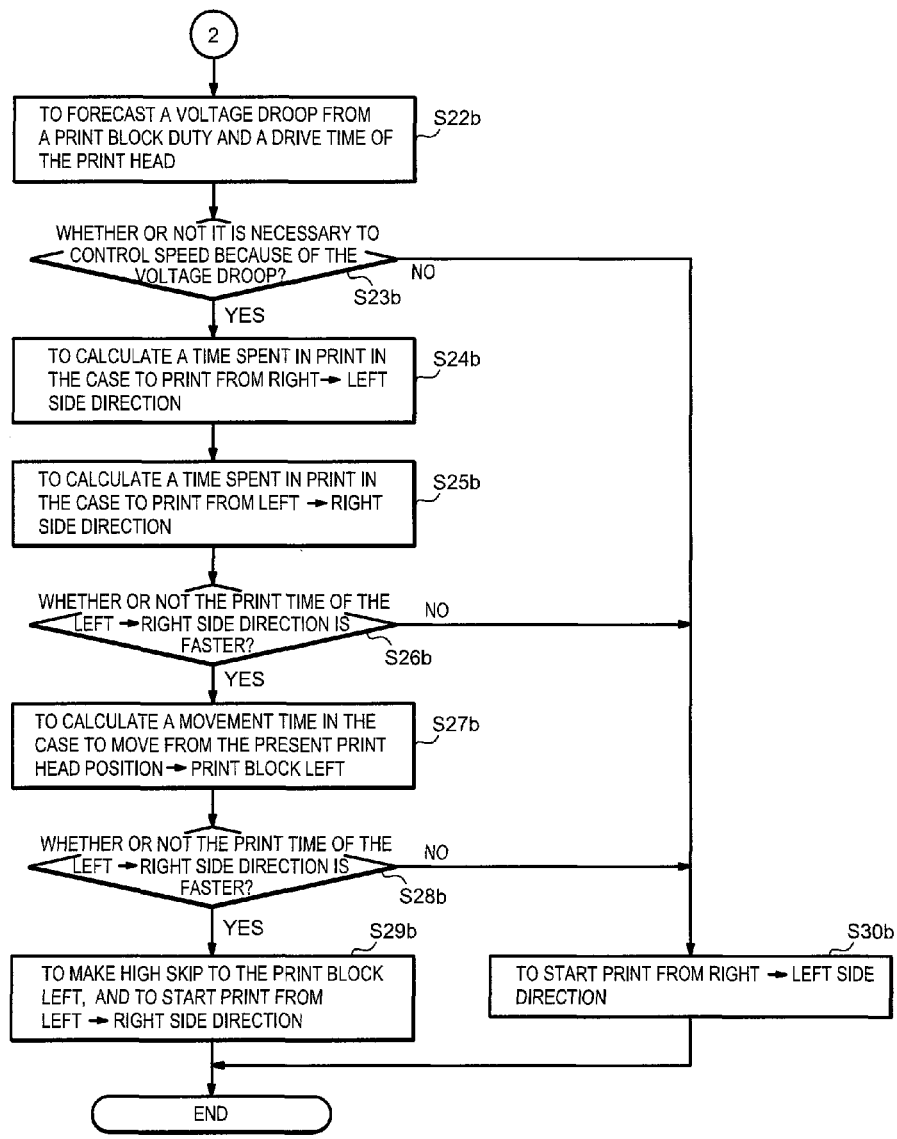
FIG. 13 is a third flow chart for explaining print process in embodiment 2.

It is to explain a function of the structure stated above by referring to FIG. 10 and by following steps that are shown by S in the diagram of flow chart for explaining print process in embodiment 2 of FIG. 11, FIG. 12 and FIG. 13.

Moreover, operation in the present embodiment is to determines print direction and print path for performing a shortest print when the division print is necessary with respect to operation of embodiment 1, and to performs the print by following the print direction and the print path. Therefore, explanation of the same operation as embodiment 1 is omitted, and parts different from the operation in embodiment 1 are explained.

S1b~S5b: Because they are the same process as S1a~S5a in FIG. 3, the explanation is omitted.

S6b~S8b: Because they are the same process as S6a~S18a in FIG. 3, the explanation is omitted.

Figure 15:
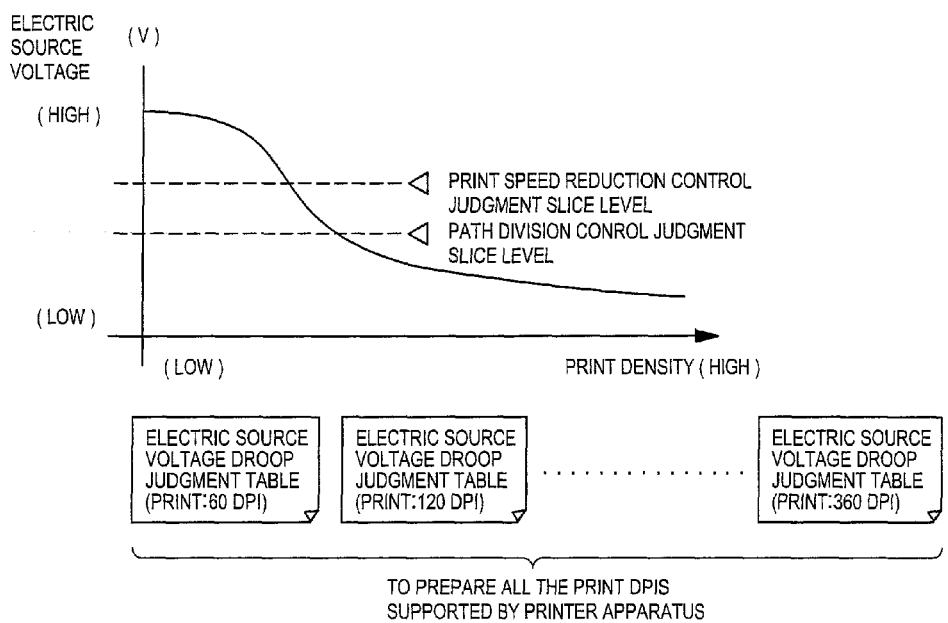
FIG. 15 is a graph showing a relation between print density and electric source voltage droop in embodiment 2.
Figure 16:
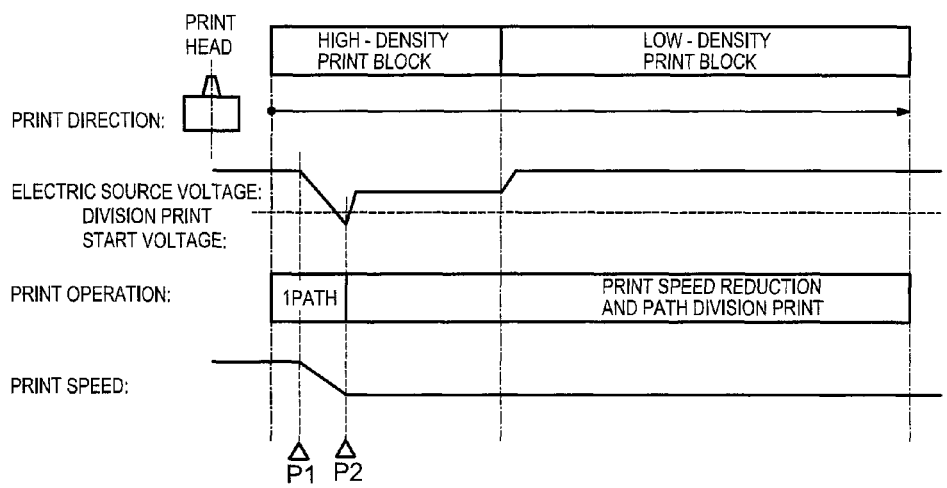
FIG. 16 is an explanation diagram of print operation in a former example.

S9b: The path division print judgment control 172, after executed the search of the high-density print block in the print block similarly to embodiment 1, forecasts the electric source voltage droop according to the block print to be printed on the basis of the high-density print column number and the impact dot number that are counted. In the present process, it is firstly judged whether or not the path division control is necessary according to the electric source voltage droop caused by the high-density print block print. The judgment whether or not the path division is necessary is to be performed on the basis of the relation between the print density (print block duty) and the electric source voltage droop according to the drive time of the print head, for example, the forecast is performed by using a graph that shows a relation between the print density and the electric source voltage droop in embodiment 2 of FIG. 15. Further, the graph used in the present process is prepared per print density (print DPI) in the horizontal direction in order to execute a more correct judgment, and the need/needless of the path division control according to the electric source voltage droop is judged by using a graph suitable for the print density in the horizontal direction.

S10b: The path division print judgment control 172, after judged that the path division is necessary, shifts the process to S11b; and after judged unnecessary, shifts the process to S12b.

S11b: The path division print judgment control 172 generates expanded data in the time to perform a path division. In the present process, the first path of impact data is generated in the time to perform a path division print; print times of the necessary path division is updated and is stored in the volatile memory; the process is shifted to S9b; and the first path of the electric source voltage droop check is executed again.

Moreover, the expanded data in the time to perform the path division is the impact data that is expanded for restraining the droop of the electric source voltage, and through printing all the expanded data that is path divided, one line of the print is completed.

S12b~S30b: Because they are the same process as S19a~S37a in FIG. 3, the explanation is omitted.

Figure 14:
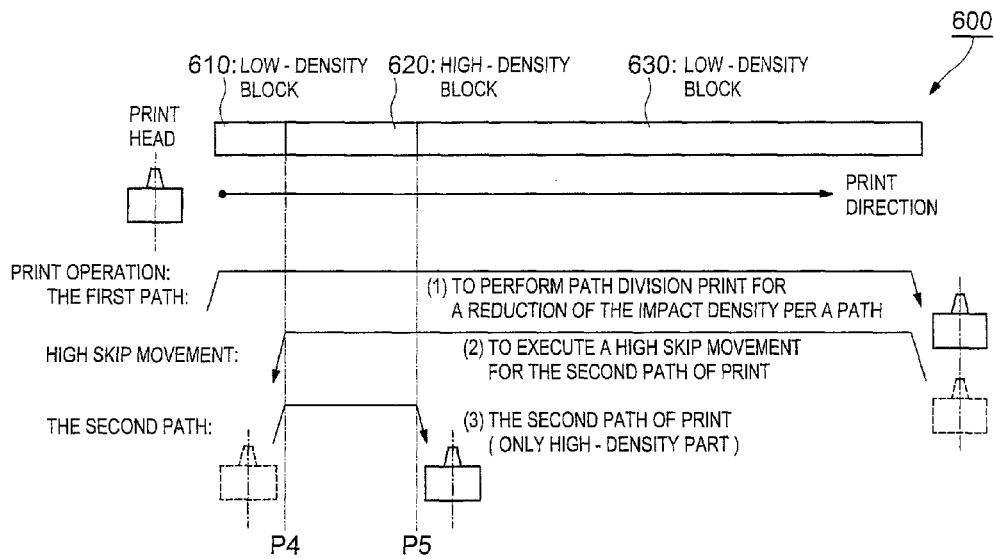
FIG. 14 is an explanation diagram of print operation through path division in embodiment 2.

It is to explain a print method through a path division in the present embodiment by using an explanation diagram of print operation through a path division in embodiment 2 of FIG. 14.

With respect to FIG. 14, it is supposed that a 10 inches of the print block 600 comprises a 1 inch of low-density print block, a 2 inches of high-density print block and a 7 inches of low-density print block from the left side in the diagram, and as a result of the above process, movement times of the print head is calculated as twice, and print direction is determined from the left to the right direction in the diagram.

Firstly, in the first path of the print operation, through moving the print head from the left to the right in the diagram, it is to print impact data comprised of the 1 inch of low-density print block, the 2 inches of high-density print block that is expanded for the first path of print, and the 7 inches of low-density print block.

Next, the print head is made to high skip move from the right to the left in the diagram, to the left end P4 of the high-density print block for performing the second path of print operation.

Next, through moving the print head from the left (P4) to the right (P5) in the diagram, and through printing the impact data of the 2 inches of high-density print block that is expanded for the first path of print, one line of print operation is completed.

As explained above, in embodiment 2, in addition to the effect of embodiment 1, even when the division print becomes necessary because of the rapid electric source voltage droop, such effect is obtained that it is possible to improve print efficiency.

Further, through forecasting the electric source voltage droop for every print density (print DPI) in the horizontal direction, such effect is obtained that it is possible to grasp an electric source voltage droop level with great precision.

The present invention is not limited to the foregoing embodiments but many modifications and variations are possible within the spirit and scope of the appended claims of the invention.

What is claimed is:

1. A print apparatus that is used for printing received data received from an upper apparatus by repeatedly moving a print head, comprising:
    an expanding section that expands the received data into print image data;
    a confirming section that confirms a print density of the print image data expanded by the expanding section, and confirms existence/inexistence of high-density print data whose print density is higher than a predetermined value;
    a determining section that, when the confirming section confirms the existence of the high-density print data, calculates a print operation time in the case to print by moving the print head in a forward direction, calculates a print operation time in the case to print by moving the print head in a backward direction, and determines a print direction according to these print operation time; and
    a print controlling section that prints in the direction determined by the determining section.

2. The print apparatus according to claim 1, further comprising:
    an electric source voltage detecting section that detects a droop of electric source voltage in the case to perform a high-density print,
    wherein when the electric source voltage detecting section detects the droop of the electric source voltage that exceeds a predetermined value, and judges that division print is necessary that prints one line of print image data by moving the print head plural times in the forward direction or the backward direction,
    the expanding section expands print image data in every movement of the print head.

3. The print apparatus according to claim 1,
    wherein the determining section calculates a forward direction print operation time to print by moving the print head in a forward direction, calculates a backward direction print operation time by adding a time to move the print head in a forward direction to the print operation time to move the print head in a backward direction, compares the forward direction print operation time with the backward direction print operation time, and selects a print direction corresponding to a shorter operation time.

4. The print apparatus according to claim 3, further comprising:
    an electric source voltage detecting section that detects a droop of electric source voltage in the case to perform a high-density print,
    wherein when the electric source voltage detecting section detects the droop of the electric source voltage that exceeds a predetermined value, and judges that division print is necessary that prints one line of print image data by moving the print head plural times in the forward direction or the backward direction,
    the expanding section expands print image data in every movement of the print head.

5. The print apparatus according to claim 1,
    wherein the confirming section extracts the print image data expanded by the expanding section per line perpendicular to a movement direction of the print head, judges whether or not print dots in the line exceed a first threshold, and when the line that exceeds the first threshold continuously exceeds a second threshold, confirms the existence of the high-density print data.

6. The print apparatus according to claim 5, further comprising:
    an electric source voltage detecting section that detects a droop of electric source voltage in the case to perform a high-density print,
    wherein when the electric source voltage detecting section detects the droop of the electric source voltage that exceeds a predetermined value, and judges that division print is necessary that prints one line of print image data by moving the print head plural times in the forward direction or the backward direction, the expanding section expands print image data in every movement of the print head.

7. The print apparatus according to claim 5,
wherein the determining section calculates a forward direction print operation time to print by moving the print head in a forward direction, calculates a backward direction print operation time by adding a time to move the print head in a forward direction to the print operation time to move the print head in a backward direction, compares the forward direction print operation time with the backward direction print operation time, and selects a print direction corresponding to a shorter operation time.

8. The print apparatus according to claim 7, further comprising:
an electric source voltage detecting section that detects a droop of electric source voltage in the case to perform a high-density print,
wherein when the electric source voltage detecting section detects the droop of the electric source voltage that exceeds a predetermined value, and judges that division print is necessary that prints one line of print image data by moving the print head plural times in the forward direction or the backward direction,
the expanding section expands print image data in every movement of the print head.

9. A print method that is used for printing received data received from an upper apparatus by repeatedly moving a print head, comprising:
a step that expands the received data into print image data;
a step that confirms a print density of the expanded print image data, and confirms existence/inexistence of high-density print data whose print density is higher than a predetermined value;
a step that, when the existence of the high-density print data is confirmed, calculates a print operation time in the case to print by moving the print head in a forward direction, calculates a print operation time in the case to print by moving the print head in a backward direction, and determines a print direction according to these print operation time; and
a step that prints in the determined direction.

10. The print method according to claim 9, further comprising:
a step that, when a droop of electric source voltage that exceeds an established value in the case to perform a high-density print is detected and it is judged that division print is necessary that prints one line of print image data by moving the print head plural times in the forward direction or the backward direction, expands print image data in every movement of the print head,
wherein the step that confirms existence/inexistence of the high-density print data confirms a print density of the print image data in every movement of the print head.

11. The print method according to claim 9,
wherein the step that determines the print direction, calculates a forward direction print operation time to print by moving the print head in a forward direction, calculates a backward direction print operation time by adding a time to move the print head in a forward direction to the print operation time to move the print head in a backward direction, compares the forward direction print operation time with the backward direction print operation time, and selects a print direction corresponding to a shorter operation time.

12. The print method according to claim 11, further comprising:
a step that, when a droop of electric source voltage that exceeds an established value in the case to perform a high-density print is detected and it is judged that division print is necessary that prints one line of print image data by moving the print head plural times in the forward direction or the backward direction, expands print image data in every movement of the print head,
wherein the step that confirms existence/inexistence of the high-density print data confirms a print density of the print image data in every movement of the print head.

13. The print method according to claim 9,
wherein the step that confirms existence/inexistence of the high-density print data extracts the expanded print image data per line perpendicular to a movement direction of the print head, judges whether or not print dots in the line exceed a first threshold, and when the line that exceeds the first threshold continuously exceeds a second threshold, confirms the existence of the high-density print data.

14. The print method according to claim 13, further comprising:
a step that, when a droop of electric source voltage that exceeds an established value in the case to perform a high-density print is detected and it is judged that division print is necessary that prints one line of print image data by moving the print head plural times in the forward direction or the backward direction, expands print image data in every movement of the print head,
wherein the step that confirms existence/inexistence of the high-density print data confirms a print density of the print image data in every movement of the print head.

15. The print method according to claim 13,
wherein the step that determines the print direction, calculates a forward direction print operation time to print by moving the print head in a forward direction, calculates a backward direction print operation time by adding a time to move the print head in a forward direction to the print operation time to move the print head in a backward direction, compares the forward direction print operation time with the backward direction print operation time, and selects a print direction corresponding to a shorter operation time.

16. The print method according to claim 15, further comprising:
a step that, when a droop of electric source voltage that exceeds an established value in the case to perform a high-density print is detected and it is judged that division print is necessary that prints one line of print image data by moving the print head plural times in the forward direction or the backward direction, expands print image data in every movement of the print head,
wherein the step that confirms existence/inexistence of the high-density print data confirms a print density of the print image data in every movement of the print head.

* * * * *